(12) United States Patent  (10) Patent No.: US 8,818,121 B2
Matsui  (45) Date of Patent: Aug. 26, 2014

(54) MOTION DETECTOR, IMAGE PROCESSING DEVICE, AND IMAGE PROCESSING SYSTEM

(75) Inventor: Hajime Matsui, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 78 days.

(21) Appl. No.: 13/597,113

(22) Filed: Aug. 28, 2012

(65) Prior Publication Data

US 2013/0216133 A1 Aug. 22, 2013

(30) Foreign Application Priority Data

Feb. 21, 2012 (JP) ................................ 2012-035349

(51) Int. Cl.
*G06K 9/36* (2006.01)

(52) U.S. Cl.
USPC .......................................... 382/236; 382/232

(58) Field of Classification Search
None
See application file for complete search history.

(56) References Cited

U.S. PATENT DOCUMENTS

| | | | |
|---|---|---|---|
| 8,059,713 B2 | 11/2011 | Kazui et al. | |
| 8,194,746 B2 | 6/2012 | Suzuki | |
| 2006/0023788 A1* | 2/2006 | Otsuka et al. | 375/240.16 |
| 2007/0217507 A1 | 9/2007 | Kazui et al. | |
| 2008/0137731 A1* | 6/2008 | Sekiguchi et al. | 375/240.01 |
| 2008/0165856 A1 | 7/2008 | Suzuki | |
| 2008/0181304 A1* | 7/2008 | Sekiguchi et al. | 375/240.12 |
| 2008/0212719 A1 | 9/2008 | Okada et al. | |
| 2008/0310511 A1 | 12/2008 | Suzuki | |
| 2009/0028427 A1* | 1/2009 | Yamada et al. | 382/166 |
| 2009/0073277 A1* | 3/2009 | Numata et al. | 348/222.1 |
| 2009/0080534 A1* | 3/2009 | Sekiguchi et al. | 375/240.25 |
| 2009/0110067 A1* | 4/2009 | Sekiguchi et al. | 375/240.12 |
| 2009/0123066 A1* | 5/2009 | Moriya et al. | 382/166 |
| 2009/0208122 A1 | 8/2009 | Taketa et al. | |
| 2011/0026593 A1* | 2/2011 | New et al. | 375/240.12 |

FOREIGN PATENT DOCUMENTS

| | | |
|---|---|---|
| JP | 2005-151167 | 6/2005 |
| JP | 2006-129248 A | 5/2006 |
| JP | 2007-166521 | 6/2007 |
| JP | 2007-251453 A | 9/2007 |
| JP | 2008-219141 A | 9/2008 |
| JP | 2009-124278 | 6/2009 |
| JP | 2009-171608 A | 7/2009 |

* cited by examiner

*Primary Examiner* — Li Liu

(74) *Attorney, Agent, or Firm* — Knobbe, Martens, Olson & Bear, LLP

(57) ABSTRACT

According to one embodiment, a motion vector detection device includes a reference image encoder, a cutoff module, a reference image decoder, and a block matching module. The reference image encoder is configured to generate a plurality of encoded components. The cutoff module is configured to select, according to a predetermined priority, one or a plurality of encoded components so that a data length is equal to or less than a predetermined fixed length. The reference image decoder is configured to decode the selected one or the plurality of encoded components to reproduce one or a plurality of image components. The block matching module is configured to detect, based on a motion-detection target block in an input image and the reproduced one or the plurality of image components of a matching-target block of the reference image corresponding to the motion-detection target block, a motion vector of the motion-detection target block.

20 Claims, 13 Drawing Sheets

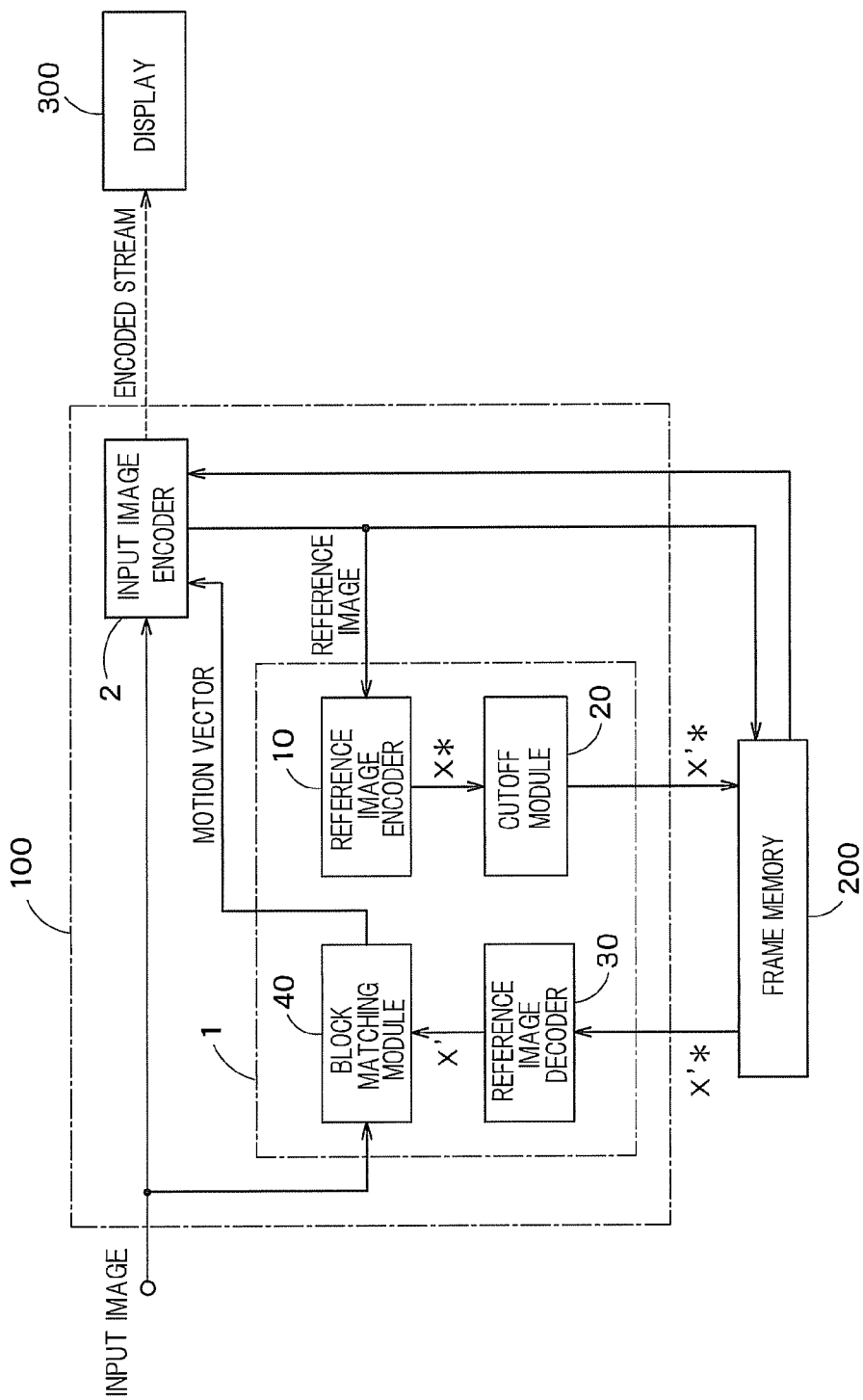
F I G. 1

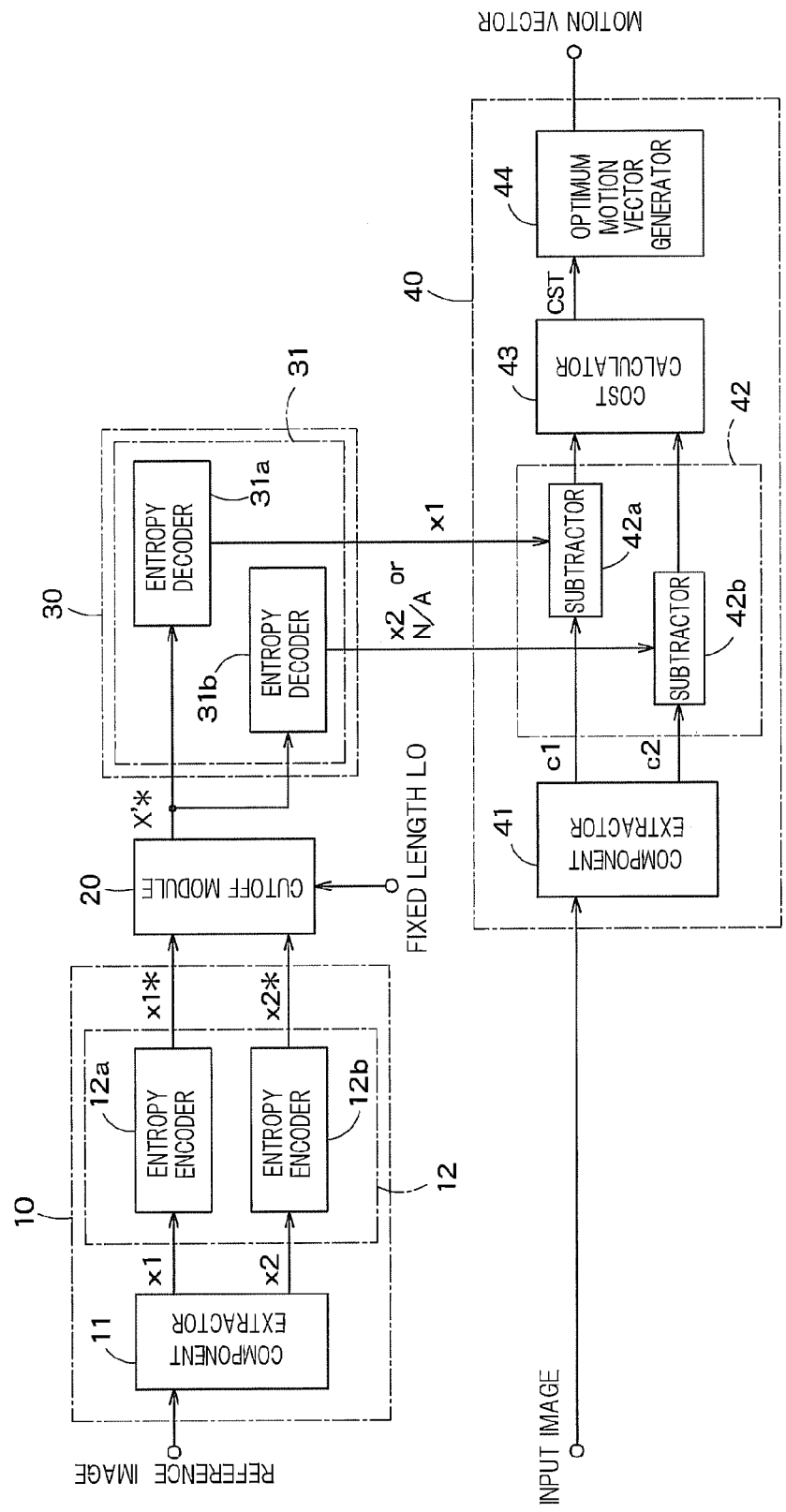
F I G. 2

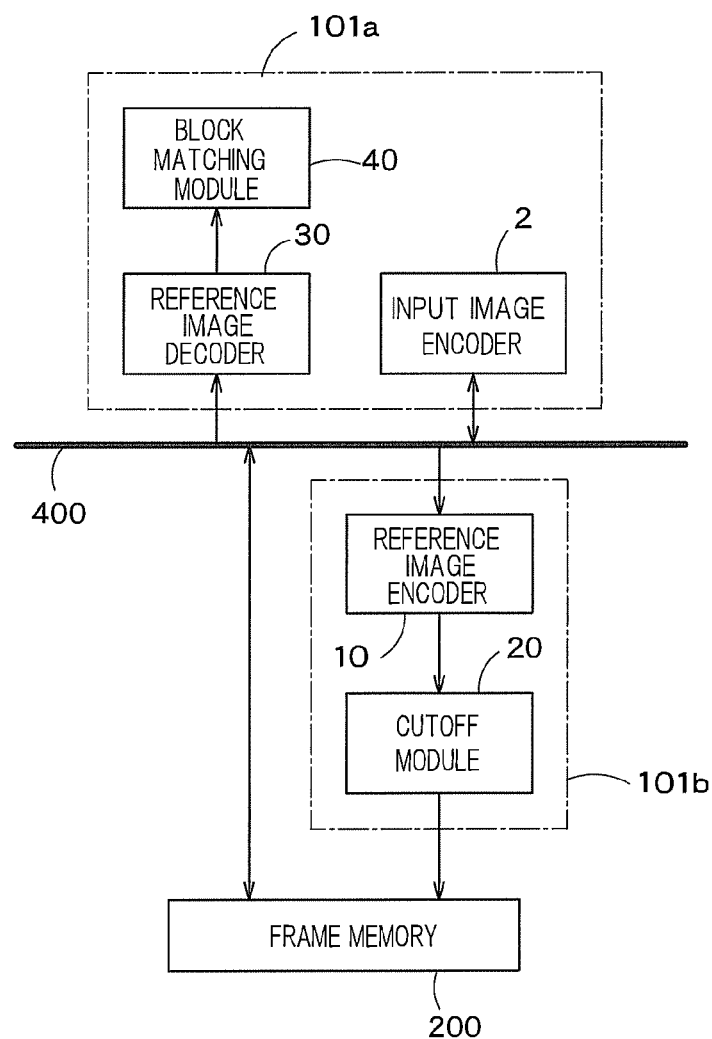
F I G. 5

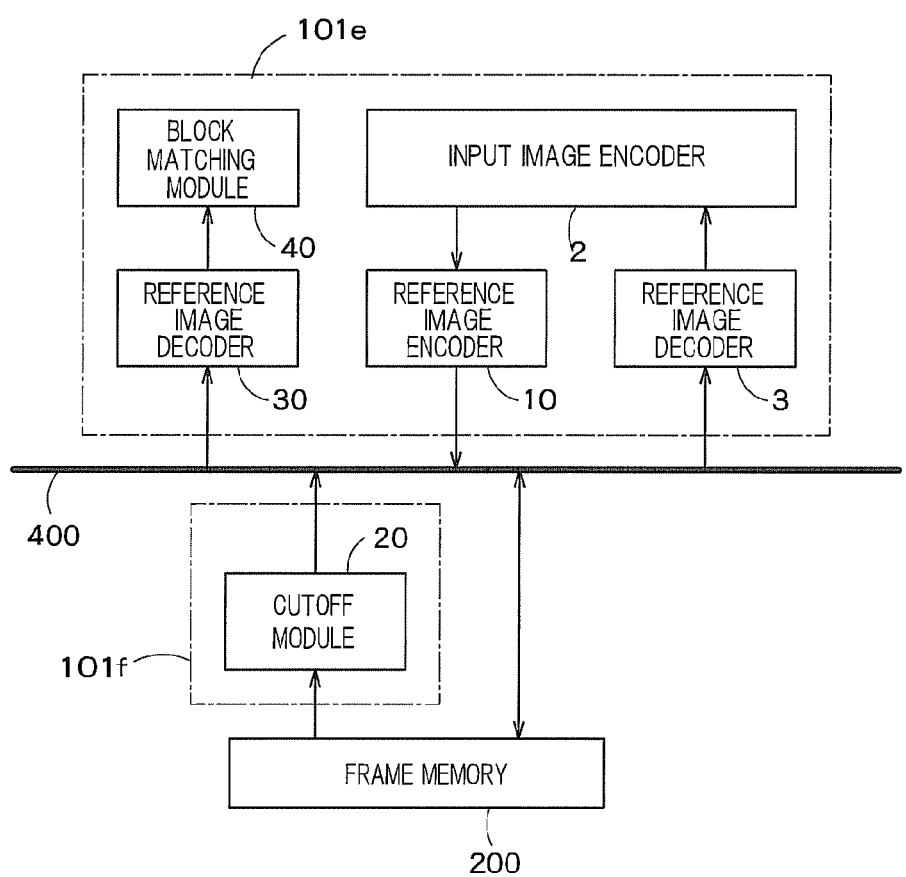
F I G. 10

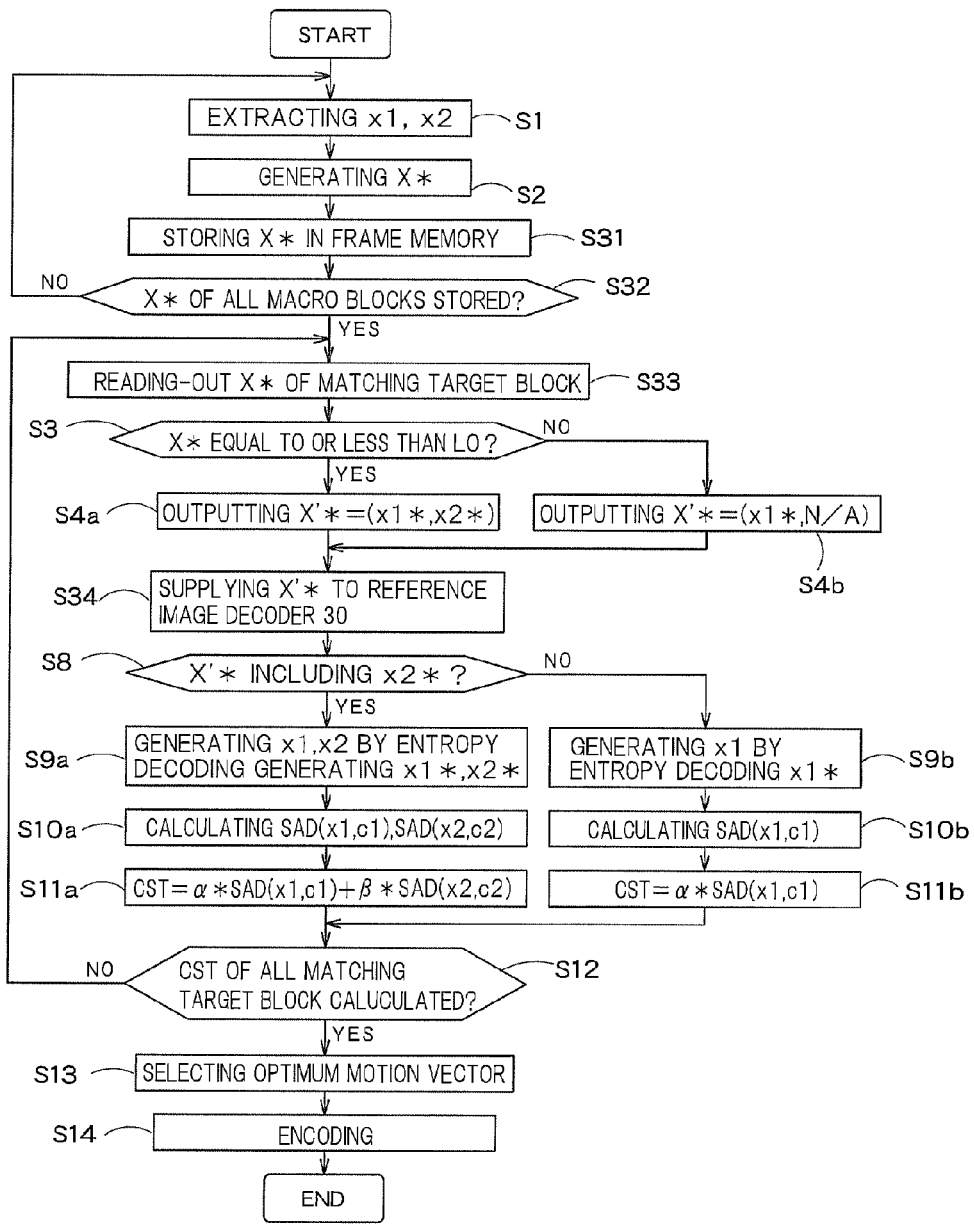
F I G. 11

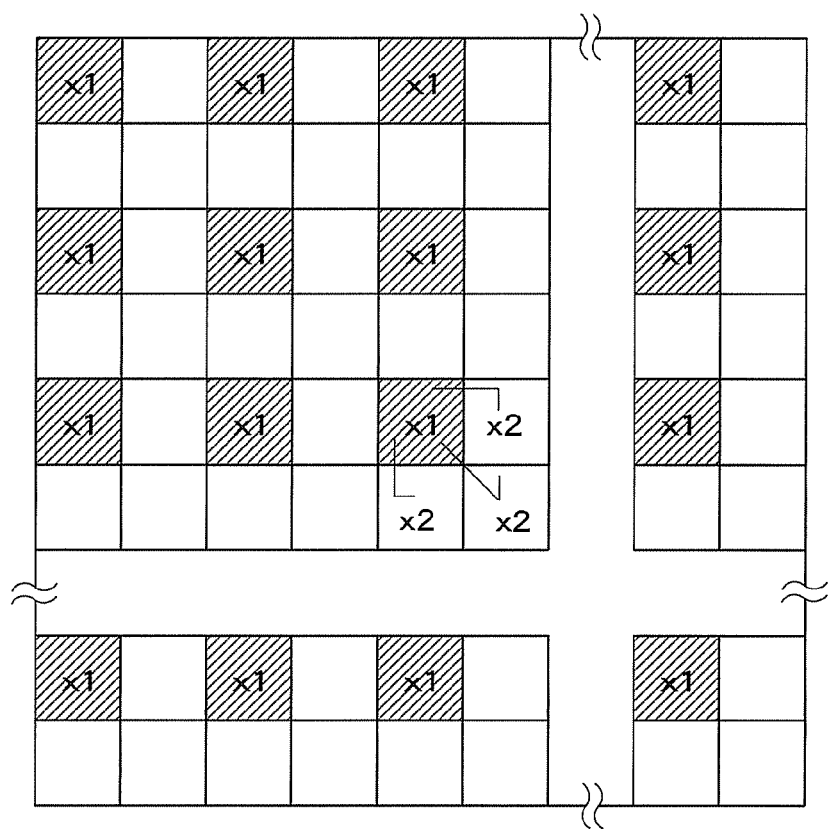
F I G. 12

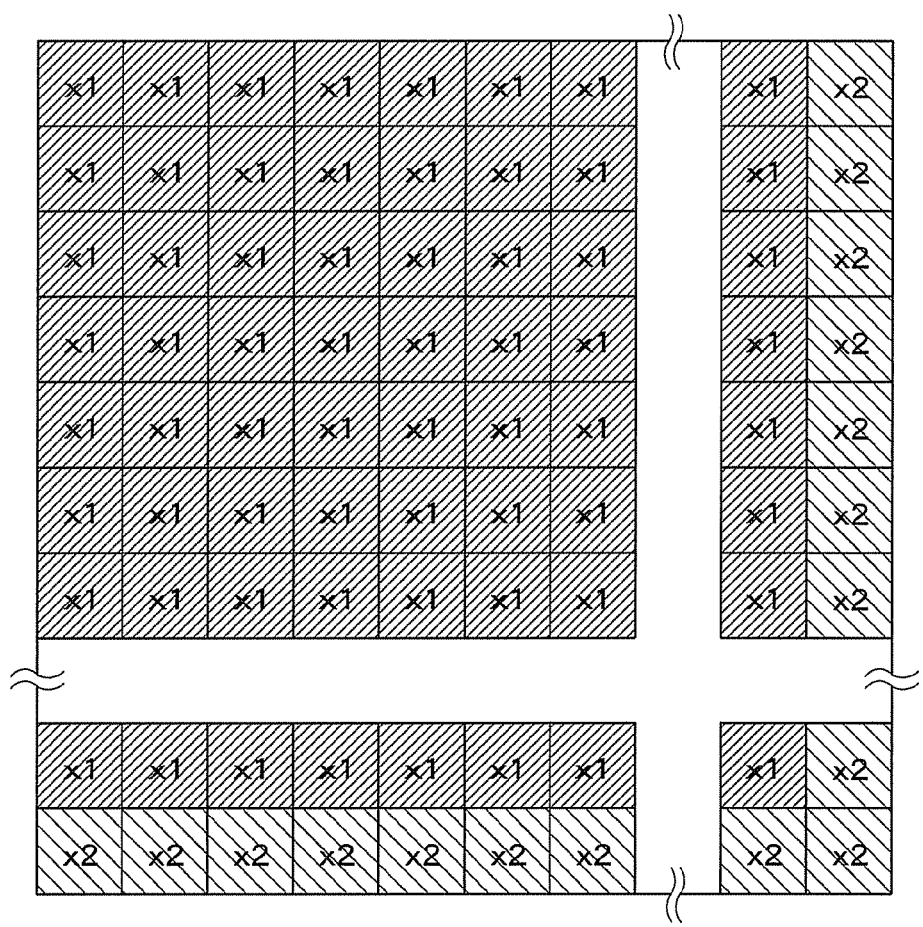
F I G. 13

MOTION DETECTOR, IMAGE PROCESSING DEVICE, AND IMAGE PROCESSING SYSTEM

CROSS REFERENCE TO RELATED APPLICATIONS

This application is based upon and claims the benefit of priority from the prior Japanese Patent Application No. 2012-35349, filed on Feb. 21, 2012, the entire contents of which are incorporated herein by reference.

FIELD

Present inventions relate to a motion detector, an image processing device, and an image processing system.

BACKGROUND

In order to compression coding a moving image efficiently, an intra-frame motion prediction coding is performed on moving image compression coding schemes such as H.264. Under the intra-frame motion prediction coding, an intra-frame prediction image is generated by performing motion detection and a difference between the intra-frame prediction image and the actual image is compression-coded.

For performing motion detection, it is necessary to perform block matching operation between an input image and a reference image many times. Therefore, there is a problem that amount of transferred data becomes large.

BRIEF DESCRIPTION OF THE DRAWINGS

FIG. 1 is a schematic block diagram of an image processing system according to the first embodiment.

FIG. 2 is a schematic block diagram showing the internal configuration of the motion detector 1.

FIG. 5 is a diagram showing another example of the flow of image data in the image processing system.

FIG. 10 is a diagram showing one example of the flow of image data in the image processing system of FIG. 9.

FIG. 11 is a flowchart for encoding the input image by the image processing system shown in FIGS. 9 and 10.

FIG. 12 is a diagram illustrating the image components x1 and x2 represented by equations (3) and (4).

FIG. 13 is a diagram illustrating the image components x1 and x2 represented by the equations (5) and (6).

DETAILED DESCRIPTION

Figure 3:
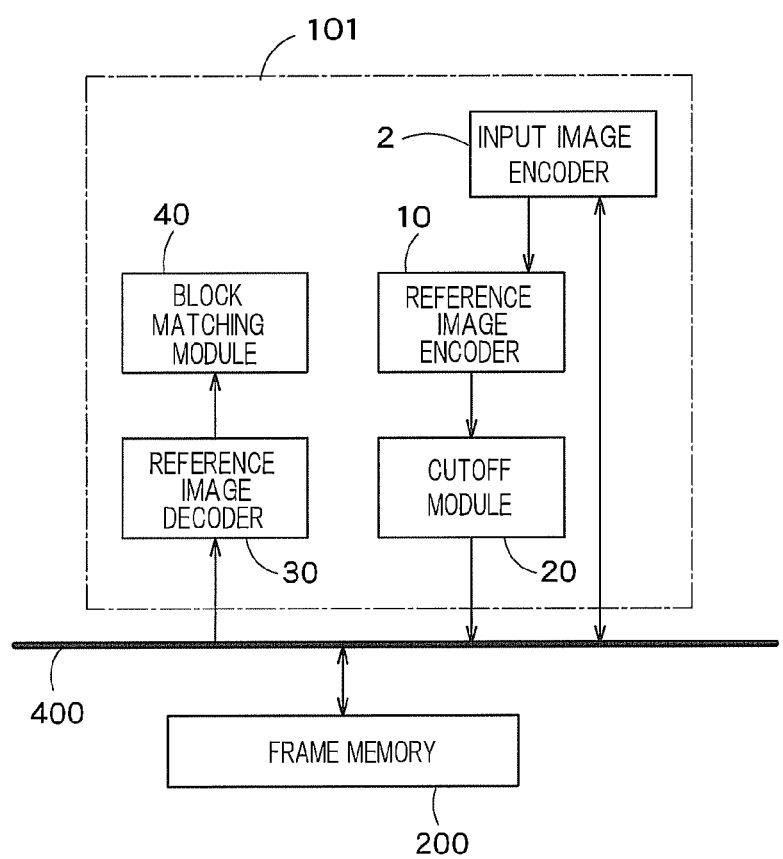
FIG. 3 is a diagram showing one example of the flow of image data in the image processing system.

In general, according to one embodiment, a motion vector detection device includes a reference image encoder, a cutoff module, a reference image decoder, and a block matching module. The reference image encoder is configured to entropy-encode each of a plurality of image components extracted from a reference image, to generate a plurality of encoded components. The cutoff module is configured to select, according to a predetermined priority, one or a plurality of encoded components so that a data length is equal to or less than a predetermined fixed length. The reference image decoder is configured to decode the selected one or the plurality of encoded components to reproduce one or a plurality of image components. The block matching module is configured to detect, based on a motion-detection target block in an input image and the reproduced one or the plurality of image components of a matching-target block of the reference image corresponding to the motion-detection target block, a motion vector of the motion-detection target block.

Hereafter, embodiments of a motion detector, an image processing device, and an image processing system will be described more specifically with reference to the drawings.

First Embodiment

FIG. 1 is a schematic block diagram of an image processing system according to the first embodiment. The image processing system has an image processing device 100, a frame memory 200, and a display 300.

The image processing device 100 encodes an input image, which is a moving image, and generates an encoded stream. The image processing device 100 has a motion detector (motion detecting device) 1 and an input image encoder 2. The motion detector 1 compares the input image and a reference image to generate a motion vector. A reference image is an image obtained by decoding an input image that has been encoded. The input image encoder 2 performs inter-frame encoding or the like using the generated motion vector and the reference image to encode the input image and generate the encoded stream.

The frame memory 200 stores the reference image. Further, in the present embodiment, the frame memory 200 also stores a fixed length reference code X'* that is obtained by performing entropy-encoding on the reference image and cutoff processing by the motion detector 1. The display 300, which is a liquid crystal display for example, decodes the encoded input image and displays it. Note that the image processing system can also include a storage medium for storing the encoded stream in addition to the display 300.

One of the features of the first embodiment is that the motion detector 1 does not store the reference image itself in the frame memory 200, but rather it stores the fixed length reference code X'* in the frame memory 200, and the motion detector 1 reads out the fixed length reference code X'* and decode it for using for generating a motion vector. Therefore, by reading out entropy-encoded data which is restricted to the fixed length, it is possible to suppress the amount of transferred data between the high-loaded frame memory 200 and the motion detector 1. Further, by using entropy-encoding, a loss in the amount of information of the data to be read out can be prevented. These points will be explained in further detail below.

FIG. 2 is a schematic block diagram showing the internal configuration of the motion detector 1. The motion detector 1 has a reference image encoder 10, a cutoff module 20, a reference image decoder 30, and a block matching module 40.

The input image and the reference image are divided into macro blocks for processing. The motion detector 1 performs block matching operation between a motion-detection target block of the input image and each of a plurality of matching target blocks of the reference image. A motion vector is generated by detecting a macro block that has a high degree of correlation with the motion-detection target block from among the plurality of matching target blocks.

The reference image encoder 10 has a component extractor 11 and an entropy encoder 12. The component extractor 11 extracts two or more arbitrary image components of each pixel of the reference image. For example, a brightness component is extracted as a first image component x1, and a color difference component is extracted as a second image component x2. The entropy encoder 12 has two or more entropy encoders 12a and 12b corresponding to the image components, respectively. The entropy encoder 12 entropy-encodes each of the image components x1 and x2 in macro block units to generate encoded components x1* and x2*. The reference image encoder 10 supplies the reference code X*=(x1*, x2*) to the cutoff module 20.

The cutoff module 20 performs a selection process on the reference code X* such that the data length becomes a fixed length L0 or less, and then generates a fixed length reference code X'*. The fixed length L0 is set to, for example, the maximum data length of the encoded component x1*. If the brightness component is uniform, the encoded component x1* has a small amount of information and data length becomes short. Therefore, if the reference code X* exceeds the fixed length L0, then fixed length reference code X'*=(x1*, N/A) (N/A indicates that data does not exist) is generated, and if the reference code X* does not exceed the fixed length L0, then fixed length reference code X'*=(x1*, x2*) is generated. The cutoff module 20 stores the fixed length reference code X'* in the frame memory 200.

The reference image decoder 30 has an entropy decoder 31. The entropy decoder 31 reads out and decodes the fixed length reference code X'* from the frame memory 200. An entropy decoder 31a decodes the encoded component x1* to reproduce the image component x1. An entropy decoder 31b decodes the encoded component x2*, if it is included in the fixed length reference code X'*, to reproduce the image component x2. If the encoded component x2* is not included in the fixed length reference code X'*, the entropy decoder 31b does not perform any particular processing. The stored local reference image X'=(x1, x2) or (x1, N/A) is supplied to the block matching module 40.

The block matching module 40 has a component extractor 41, a subtractor 42, a cost calculator 43, and an optimum motion vector generator 44. The component extractor 41 extracts image components c1 and c2 from each pixel of the input image. The image components c1 and c2 correspond to the image components x1 and x2 extracted from the reference image, respectively. A subtractor 42a calculates the difference between the image component c1 and the image component x1. A subtractor 42b calculates the difference between the image component c2 and the image component x2 if the image component x2 has been reproduced. If the encoded component x2* is not included in the fixed length reference code X'*, the subtractor 42b does not perform any particular processing.

The difference is calculated between the image component of the motion-detection target block and the image component of each of the plurality of matching target blocks. Based on the difference, the cost calculator 43 calculates the encoding efficiency, or in other words the cost, which indicates the balance between the image quality and the compression rate of an image to be encoded, for each matching target block. The optimum motion vector generator 44 generates a motion vector corresponding to the matching target block with the lowest cost and outputs it as an optimum motion vector.

Figure 4:
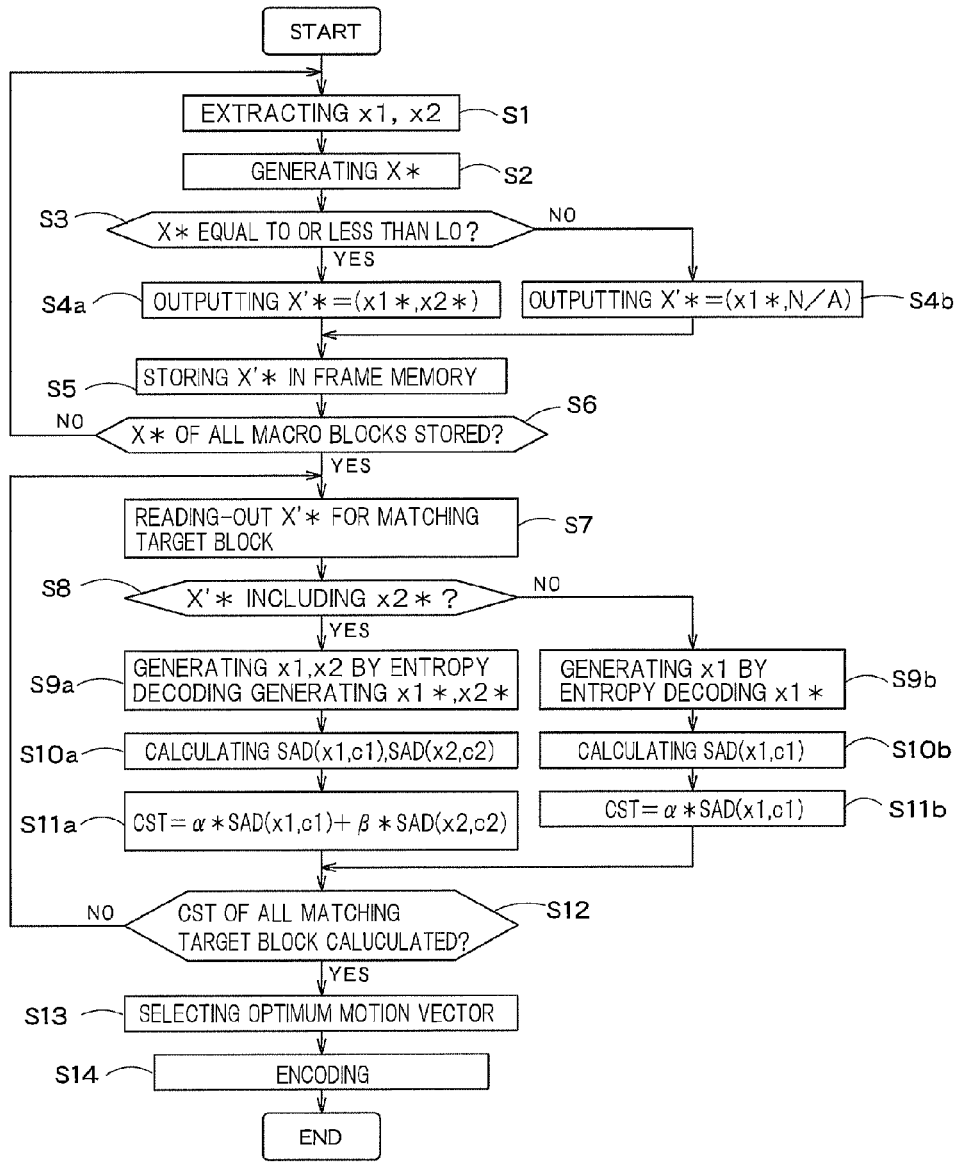
FIG. 4 is a flowchart for encoding the input image by the image processing system of FIGS. 1 to 3.

FIG. 3 is a diagram showing one example of the flow of image data in the image processing system. In the configurations shown in FIGS. 2 and 3, for example, the motion detector 1 and the input image encoder 2 are mounted on the same chip 101. FIG. 4 is a flowchart for encoding the input image by the image processing system of FIGS. 1 to 3.

First, the reference image encoder 10 and the cutoff module perform entropy-encoding and cutoff processing on the reference image in S1 to S6, and then the fixed length reference code X'* is stored in the frame memory 200. That is, the component extractor 11 of the reference image encoder 10 extracts image components x1 and x2 of each pixel of the reference image that is outputted from the input image encoder 2 (S1). Here, for example, the brightness component of the reference image is set as the image component x1, and one of the color difference components is set as the image component x2. Next, the entropy encoder 12 entropy-encodes the image components x1 and x2 using macro blocks as a unit to generate the reference code X*=(x1*, x2*) in which the encoded components x1* and x2* are connected.

In more detail, the entropy encoders 12a and 12b first perform differential pulse code modulation (DPCM). Thereby, DPCM data is generated whose value is smaller as the value of an image component of a nearby pixel is closer, or in other words, as the image component is more uniform. Next, the entropy encoder 12 performs exponential Golomb encoding on the DPCM data. In exponential Golomb encoding, as the value is smaller, the assigned data length of the code is shorter. Therefore, for example, if the image component x1 is uniform, then encoded component x1* having a short data length is generated. On the other hand, if the image component x1 is not uniform, the data length of the encoded component x1* becomes longer.

Next, the cutoff module 20 determines whether or not the reference code X* exceeds the fixed length L0 (S3). The fixed length L0 is set from outside to be, for example, the maximum data length of the encoded component x1*. If the reference code X* is equal to or less than the fixed length L0 (YES in S3), the cutoff module 20 outputs the reference code X* including the encoded components x1* and x2* as the fixed length reference code X'*=(x1*, x2*) (S4a). On the other hand, if the reference code X* exceeds the fixed length L0, the cutoff module 20 cuts and discards the encoded component x2* and outputs fixed length reference code X'*=(x1*, N/A) that includes only the encoded component x1*(S4b).

The fixed length reference code X'* is stored in the frame memory 200 via a bus 400 (S5). At this time, the amount of data transfer from the cutoff module 20 to the frame memory 200 is suppressed to the fixed length L0 regardless of the input image. The above processing is carried out for all of the macro blocks of the reference image, and the resulting reference codes X* are stored in the frame memory 200 (S6). In the frame memory 200, data in which the reference image is entropy-encoded for each macro block and the data length is suppressed to the fixed length L0, is stored. Even in the same reference image, some macro blocks may have the fixed length reference code X'* including the encoded component x2* and some other macro blocks may have the fixed length reference code X'* not including the encoded component x2*.

The fixed length reference code X'*=(x1*, x2*) when the data length of the encoded component x1* is short because of the uniform image component x1. In this case, motion can be detected with high accuracy using the image components x1 and x2. On the other hand, the fixed length reference code X'*=(x1*, N/A) when the data length of the encoded component x1* is long because of the ununiform image component x1. In this case, the encoded component x2* is not included. However, when the image component x1 is not uniform, motion can be detected with sufficiently high accuracy even if only the image component x1 is used. In either case of the fixed length reference code X'*, the data length is the fixed length L0, and thus the amount of data transfer between the motion detector 1 and the frame memory 200 can be suppressed.

Next, in S7 to S12, block matching is carried out between the motion-detection target block of the input image and the matching target blocks of the reference image. First, the entropy decoder 31 of the reference image decoder 30 reads out the fixed length reference code X'* of a matching target block from the frame memory 200 via the bus 400 (S7). The data transfer amount at this time from the frame memory to the reference image decoder 30 is also set to equal to or below the fixed length L0.

If the encoded component x2* is included in the fixed length reference code X'* (YES in S8), or in other words, if the fixed length reference code X'*=(x1*, x2*), the entropy decoder 31 decodes the encoded components x1* and x2* to reproduce the image components x1 and x2 (S9a). The component extractor 41 of the block matching module 40 extracts the image components c1 and c2 from each pixel of the motion-detection target block of the input image. The image components c1 and c2 correspond to the image components x1 and x2, respectively.

The subtractor 42a calculates the sum of absolute differences SAD (x1, c1) between the image components x1 and c1 and the subtractor 42b calculates the SAD (x2, c2) between the image components x2 and c2 for all of the pixels (S10a). The cost calculator 43 calculates the cost CST indicative of the encoding efficiency using the sums of absolute differences SAD (x1, c1) and SAD (x2, c2) by, for example, the following equation (1) (S11a).

$$CST=\alpha*SAD(x1,c1)+\beta*SAD(x2,c2) \quad (1)$$

On the other hand, if only the encoded component x1* is included in the fixed length reference code X'* (NO in S8), the image component x1 is reproduced, and the cost CST is calculated by, for example, the following equation (2) (S9b to S11b).

$$CST=\alpha*SAD(x1,c1) \quad (2)$$

The block matching module 40 calculates the cost CST for all of the matching target blocks (S12). The fixed length reference code X'* is read out from the frame memory 200 each time the cost CST is calculated. However, since the amount of data transfer from the frame memory 200 to the reference image decoder 30 is equal to or less than the fixed length L0, the amount of data transfer of the bus 400 can be suppressed.

The optimum motion vector generator 44 selects a motion vector of the matching target block which makes the cost CST the lowest, or in other words, which makes the encoding efficiency high, and outputs it as the optimum motion vector (S13). If the fixed length reference code X'* includes the encoded component x2*, the cost CST can be calculated taking into consideration the image component x2 as well, and thus, the accuracy of the motion detection can be further improved.

The coefficients $\alpha$ and $\beta$ of equations (1) and (2) are set to, for example, $\alpha$=the maximum value of SAD (x2, c2)+1, and $\beta$=1. By setting the coefficients in this way, block matching is carried out by using the sum of absolute differences SAD (x1, c1), and block matching is carried out considering the sum of absolute differences SAD (x2, c2) as well only when there are a plurality of matching target blocks with the same block matching value. Thereby, a motion vector can be searched by prioritizing the image components x1 and c1.

If the coefficients $\alpha$ and $\beta$ are to be set by hardware, the cost CST of equation (1) can be calculated by setting the sum of absolute differences SAD (x1, c1) as the more significant bit and the sum of absolute differences SAD (x2, c2) as the less significant bit and connecting them. Alternatively, for example, $\alpha$ and $\beta$ can be set such that $\alpha$=½ of the maximum value of SAD (x2, c2) and $\beta$=1 to carry out block matching by giving more weight to the image components x2 and c2.

The input image encoder 2 encodes the input image by inter-frame prediction using the optimum motion vector, and generates an encoded stream (S14). In more detail, first, an inter-frame prediction image is generated from the reference image and the motion vector, and a predicted residual image between the inter-frame prediction image and the input image is subjected to discrete cosine transform and quantization. The quantized data is subjected to variable length encoding to generate the encoded stream. Inter-frame prediction and intra-frame prediction can be used separately in accordance with the input image so as to increase the encoding efficiency.

In the first embodiment, the motion detector 1 extracts the image components x1 and x2 from the reference image and then entropy-encodes the image components. Further, the motion detector 1 stores the fixed length reference code X'* in the frame memory 200 upon performing cutoff processing so that the data length is the fixed length L0. Therefore, the amount of data transfer between the motion detector 1 and the frame memory 200 that is necessary for generating a motion vector can be suppressed. Further, when the image component x1 is not uniform, motion is detected using only the image component x1, and when the image component x1 is uniform, motion can be detected using both of the image components x1 and x2, thereby improving the accuracy.

FIG. 5 is a diagram showing another example of the flow of image data in the image processing system. In the configuration shown in FIG. 5, the input image encoder 2, the reference image decoder 30, and the block matching module 40 are mounted on a chip 101a, and the reference image encoder 10 and the cutoff module 20 are mounted on a chip 101b.

The input image encoder 2 of FIG. 3 stores a reference image which has not been subjected to cutoff processing for displaying the input image on the display 300 and also stores a reference image which has been subjected to cutoff processing in the frame memory 200 via the bus 400. In contrast, the input image encoder 2 of FIG. 5 stores only an input image which has not been subjected to cutoff processing in the frame memory 200 via the bus 400 and supplies it to the reference image encoder 10. The other processing is the same as that in the configuration of FIG. 3. By configuring the image processing system as shown in FIG. 5, the amount of data transfer via the bus 400 can be further suppressed.

Second Embodiment

Figure 6:
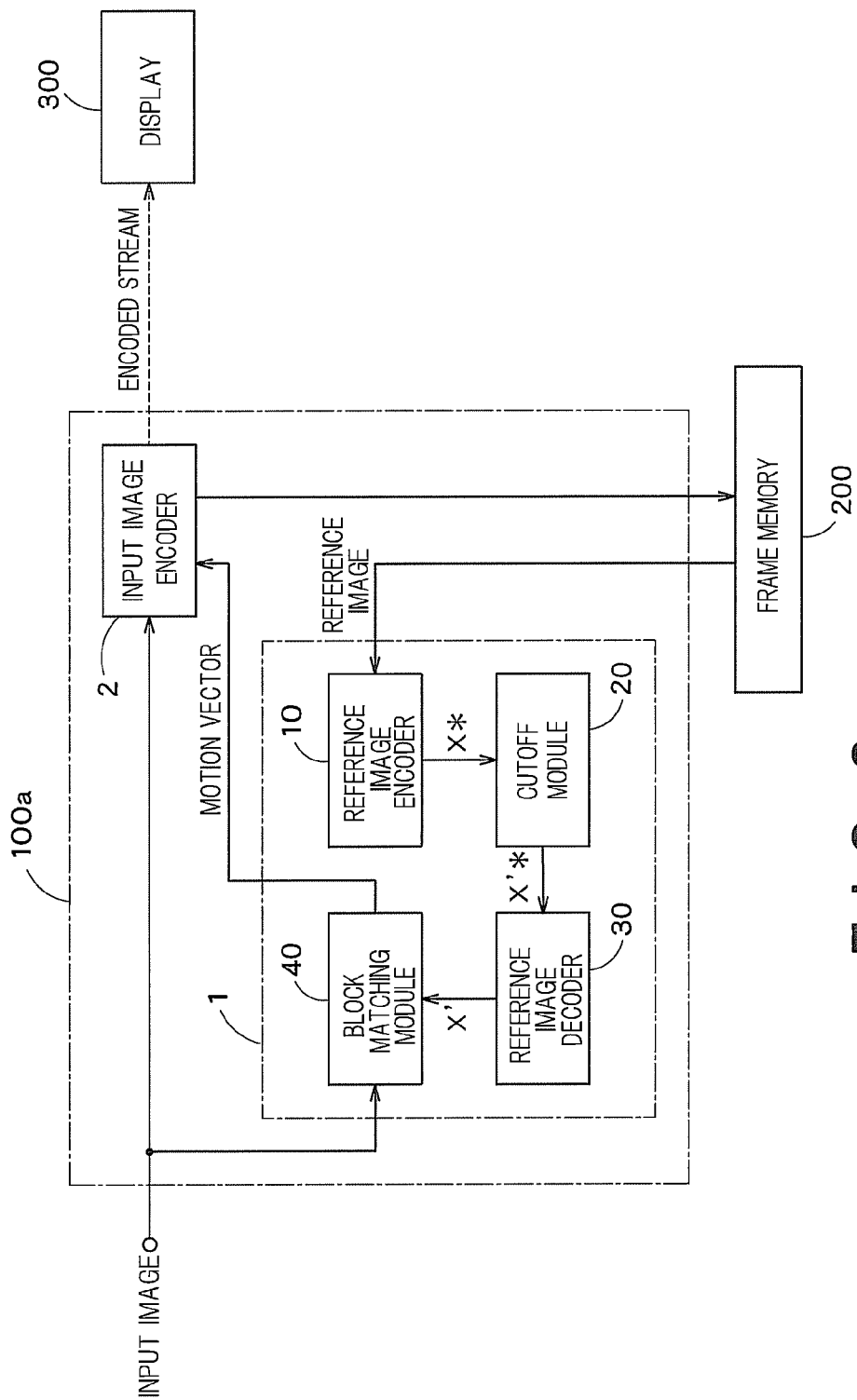
FIG. 6 is a schematic block diagram of an image processing system according to the second embodiment.
Figure 7:
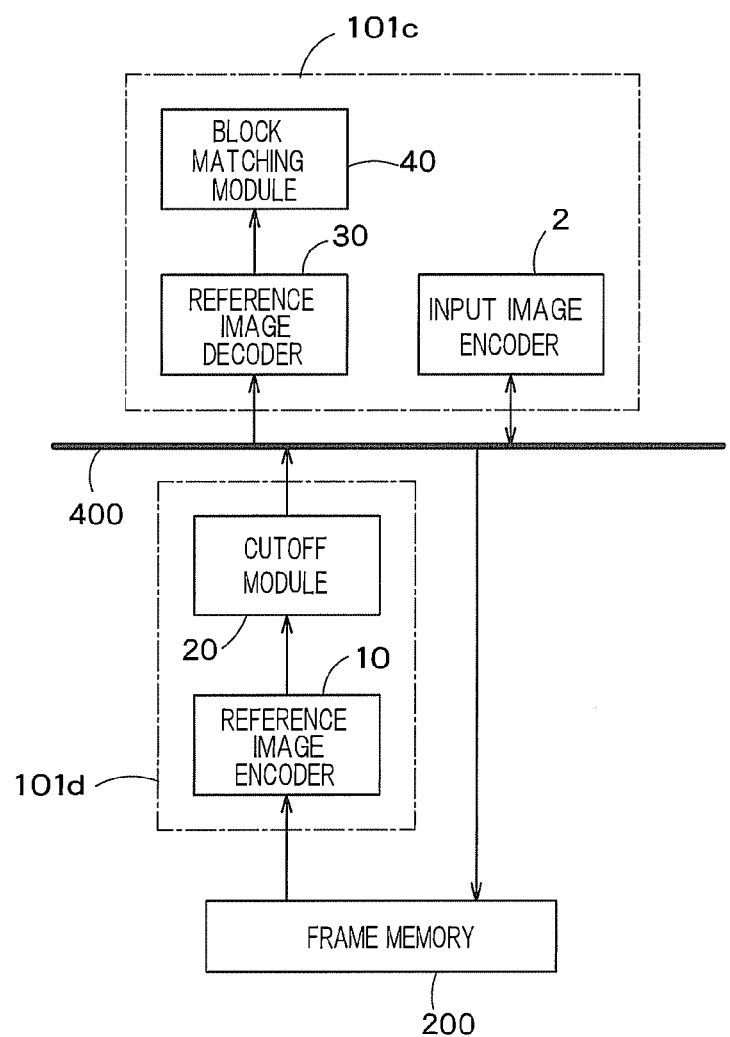
FIG. 7 is a diagram showing one example of the flow of image data in the image processing system of FIG. 6.

In the second embodiment, only the reference image is stored in the frame memory 200. FIG. 6 is a schematic block diagram of an image processing system according to the second embodiment. Same reference numerals are assigned to configuration elements common to those in FIG. 1. FIG. 7 is a diagram showing one example of the flow of image data in the image processing system of FIG. 6. In the configuration shown in FIG. 7, the input image encoder 2, the reference image decoder 30, and the block matching module 40 are mounted on a chip 101c, and the reference image encoder 10 and the cutoff module 20 are mounted on a chip 101d. The main points of difference from the first embodiment are that the fixed length reference code X'* is not stored in the frame memory 200, and the motion detector 1 reads out the reference image from the frame memory 200 to generate a motion vector.

Figure 8:
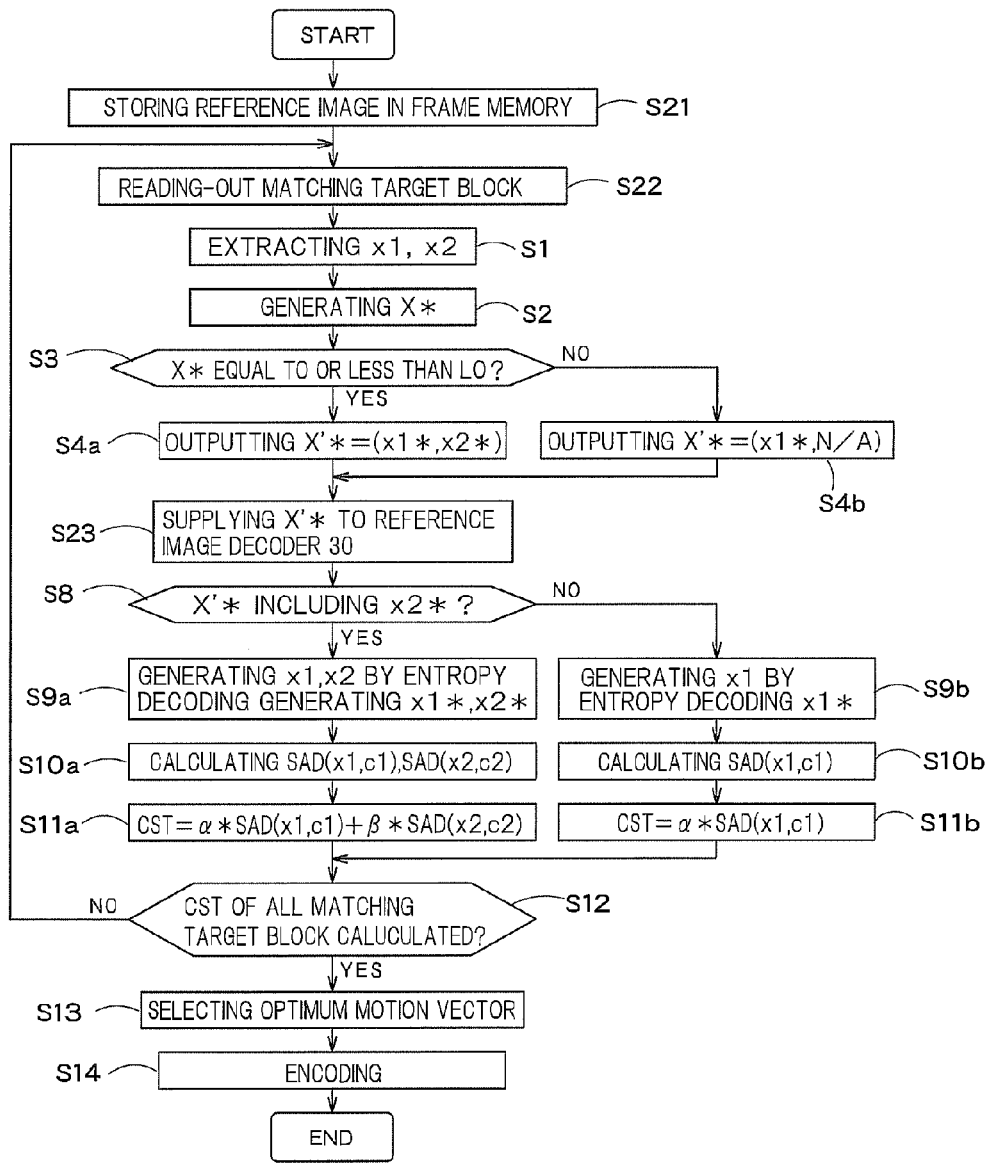
FIG. 8 is a flowchart for encoding the input image by the image processing system shown in FIGS. 6 and 7.

FIG. 8 is a flowchart for encoding the input image by the image processing system shown in FIGS. 6 and 7. Same reference numerals are assigned to processes common to those in FIG. 4. The following explanation will focus on the points of difference from the first embodiment.

First, the input image encoder 2 stores the reference image in the frame memory 200 via the bus 400 (S21). The reference image is not encoded, but since the data transferred from the input image encoder 2 to the frame memory 200 is only once per reference image, the amount of data transfer of the bus 400 is not greatly increased. Next, the reference image encoder 10 reads out the reference image from the frame memory 200 (S22). The reference image is transferred from the frame memory 200 to the reference image encoder 10 without using the bus 400, and thus there is no effect on the data transfer amount of the bus 400.

The cutoff module 20 generates the fixed length reference code X'* by the processing operations similar to those in FIG. 4 (S1 to S4a, S4b). The cutoff module 20 then supplies the fixed length reference code X'* to the reference image decoder 30 via the bus 400 (S23). Since it is the fixed length reference code X'* that is transferred by the bus 400, the amount of data transfer can be suppressed to the fixed length L0. The optimum motion vector is then generated by the processing of S8 to S13.

In the second embodiment, only the reference image is stored in the frame memory 200, and thus the amount of data transfer by the bus 400 can be suppressed and motion can be detected with high accuracy, and the capacity of the frame memory 200 can be minimized.

Third Embodiment

Figure 9:
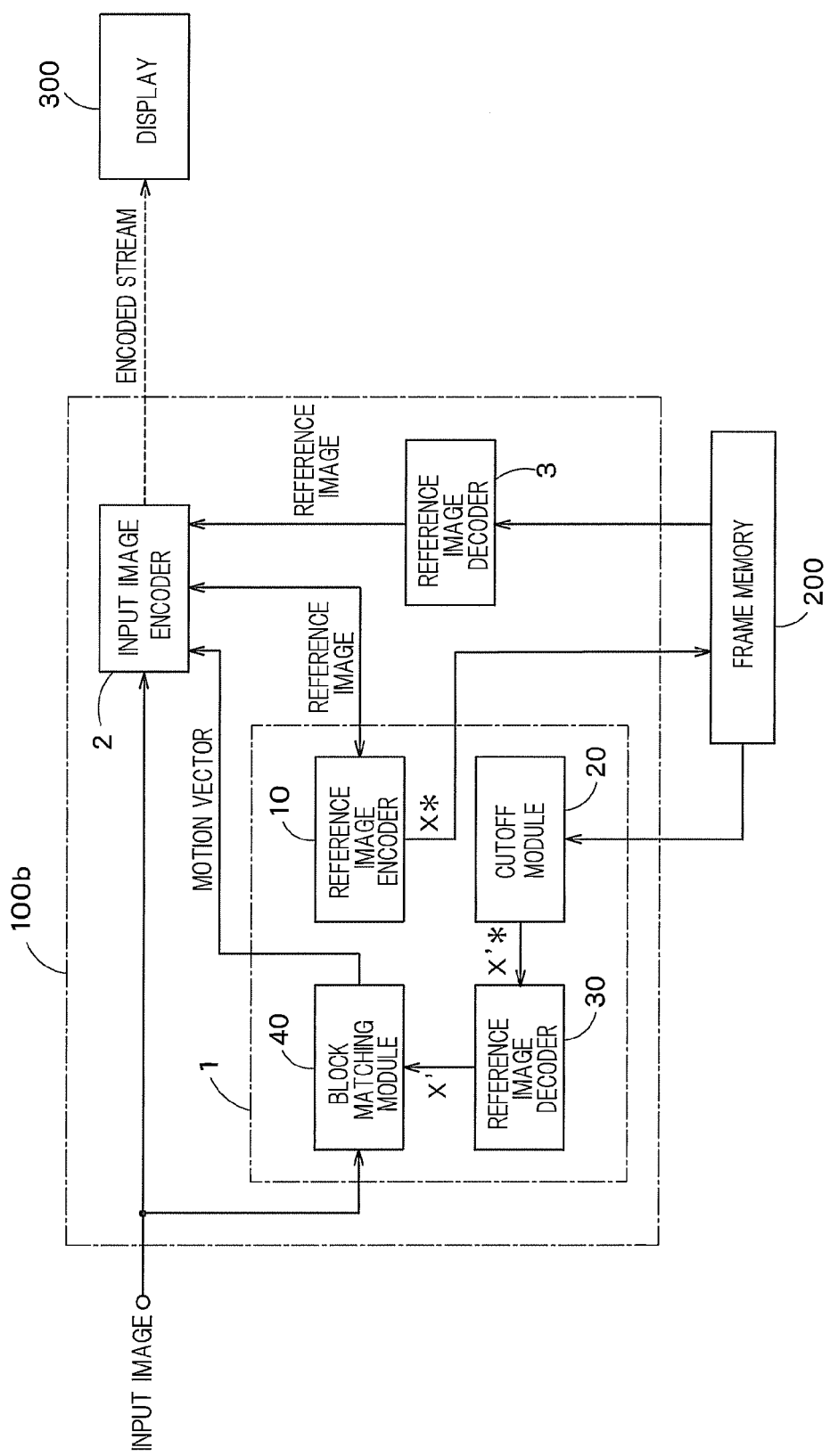
FIG. 9 is a schematic block diagram of an image processing system according to the third embodiment.

In the third embodiment, a reference image that has been entropy-encoded is stored in the frame memory 200. FIG. 9 is a schematic block diagram of an image processing system according to the third embodiment. Same reference numerals are assigned to configuration elements common to those in FIG. 1. The image processing device 100b further has a reference image decoder 3 that decodes a reference image that has been entropy-encoded and stored in the frame memory 200.

FIG. 10 is a diagram showing one example of the flow of image data in the image processing system of FIG. 9. In the configuration shown in FIG. 10, the input image encoder 2, the reference image decoder 3, the reference image encoder 10, the reference image decoder 30, and the block matching module 40 are mounted on a chip 101e, and the cutoff module 20 is mounted in a chip 101f. The main point of difference from the first and second embodiments is that a reference image that has been entropy-encoded by the reference image encoder 10 is stored in the frame memory 200. FIG. 11 is a flowchart for encoding the input image by the image processing system shown in FIGS. 9 and 10. Same reference numerals are assigned to processing operations common to those in FIG. 4. The following explanation will focus on the points of difference from the first and second embodiments.

First, the reference image encoder 10 extracts the image components x1 and x2 of each pixel of the reference image (S1), and entropy-encodes the image components x1 and x2 to generate the reference code X* (S2). The reference image encoder 10 stores the reference code X* in the frame memory 200 via the bus 400 (S31). The above processing is performed for all of the macro blocks within the reference image (S32). In the frame memory 200, the reference code X* obtained by entropy-encoding the reference image is stored. Note that, because the reference code X* is not subjected to cutoff processing, no information is lost.

Next, the cutoff module 20 reads out the reference code X* of the matching target block within the reference image from the frame memory 200 (S33). The cutoff module 20 performs cutoff processing and generates the fixed length reference code X'* (S3, S4a, S4b). Further, the cutoff module 20 transfers the fixed length reference code X'* to the reference image decoder 30 via the bus 400 (S33). It is the fixed length reference code X'* that is transferred by the bus 400, and thus the amount of data transfer is suppressed to the fixed length L0. Subsequently, the optimum motion vector is generated by the processing operations in S8 to S13.

Meanwhile, the reference image stored in the frame memory 200 as the entropy-encoded reference code X* is decoded by the reference image decoder 3 and displayed on the display 300. Because the reference code X* is not subjected to cutoff processing, the reference image decoder 3 can reproduce the reference image without any loss of information from before entropy-encoding.

In the third embodiment, since the reference image is entropy-encoded and then stored in the frame memory 200, the amount of data transfer by the bus 400 can be suppressed. Further, since the reference code X* is stored in the frame memory 200, the capacity of the frame memory 200 can be smaller compared to a case in which the reference image itself is stored.

In the present embodiment, an example has been explained in which two image components x1 and x2 are used. However, three or more image components can be used. In this case, the number of entropy encoders in the reference image encoder 10, the number of entropy decoders in the reference image decoder 30, and the number of subtractors in the block matching module 40 are adjusted to match the number of image components to be used. The cutoff module 20 should select one or a plurality of image components in a predetermined order of priority from the image components to generate the fixed length reference code X'.

For example, when three image components are used, a brightness component, a color difference component Cb, and a color difference component Cr can be used as the image components. when five image components are used, a brightness component, a direct-current component of a color difference component Cb, a direct-current component of a color difference component Cr, an alternating-current component of a color difference component Cb, and an alternating-current component of a color difference component Cr can be used as the image components.

An image component does not necessarily have to be extracted for each pixel of the input image and the reference image. For example, in a case where a macro block is constituted by 16×16 pixels, the image components x1 and x2 can be defined as in the following equations (3) and (4).

$$x1 = Y[2i][2j] (0 \leq i,j < 8) \quad (3)$$

$$x2 = Y[2i+1][2j] - Y[2i][2j], Y[2i][2j+1] - Y[2i][2j], Y[2i+1][2j+1] - Y[2i][2j] (0 \leq i,j < 8) \quad (4)$$

Y [p] [q] shows a brightness component at coordinates (p, q) within the macro block. FIG. 12 illustrates the image components x1 and x2 represented by equations (3) and (4). The image component x1 is a brightness component Y of even-numbered pixels, and the image component x2 is the difference between a brightness component Y of the original image and a brightness component Y of the image component x1. In other words, a first image component x1 corresponds to a brightness component of a macro block whose resolution has been lowered, and a second image component x2 corresponds to a difference component between an image component of the original macro block and an image component of the macro block whose resolution has been lowered. By defining the image components x1 and x2 in this way, a hierarchical search, in which block matching is first carried out over a wide area using a low-resolution image, and subsequently block matching is carried out over a narrow area using a high resolution image, can be carried out with high accuracy.

Further, the image components x1 and x2 can be defined as in the following equations (5) and (6).

$$x1 = Y[i][j] (0 \leq i,j < 16) \quad (5)$$

$$x2 = Y[i][j] (i=16 \text{ or } j=16) \quad (6)$$

FIG. 13 illustrates the image components x1 and x2 represented by the equations (5) and (6). The first image component x1 is a brightness component Y of each pixel within a macro block, and the second image component x2 is a brightness component Y of pixels, which have not been encoded yet, positioned at the right or the bottom of the macro block. When there are a plurality of matching target blocks whose costs CST are not much different from each other only by comparing the motion-detection target block and the matching target blocks, the motion detection accuracy can be increased by calculating the cost CST considering the pixels at the periphery of the block as well.

At least a part of the image processing system explained in the above embodiments can be formed of hardware or software. When the image processing system is partially formed of the software, it is possible to store a program implementing at least a partial function of the image processing system in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the image processing system can be distributed through a communication line (including radio communication) such as the Internet etc. Furthermore, the program which is encrypted, modulated, or compressed can be distributed through a wired line or a radio link such as the Internet etc. or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:

1. A motion vector detection device comprising:
a reference image encoder configured to entropy-encode each of a plurality of image components extracted from a reference image, to generate a plurality of encoded components;
a cutoff module configured to select, according to a predetermined priority, one or a plurality of encoded components so that a data length is equal to or less than a predetermined fixed length;
a reference image decoder configured to decode the selected one or the plurality of encoded components to reproduce one or a plurality of image components; and
a block matching module configured to detect, based on image contents of a motion-detection target block in an input image and the reproduced image components of a matching-target block of the reference image corresponding to the motion-detection target block, a motion vector of the motion-detection target block.

2. The device of claim 1, wherein the block matching module is configured to calculate an encoding efficiency for a plurality of matching-target blocks based on a difference between the reproduced image component and the image component of the motion-detection target block for each pixel, and to output the motion vector of the matching-target block comprising higher encoding efficiency.

3. The device of claim 2, wherein the block matching module is configured to calculate the encoding efficiency taking the predetermined priority into consideration when the plurality of image components are reproduced.

4. The device of claim 2, wherein the plurality of image components comprise a luminance component of a pixel.

5. The device of claim 4, wherein the plurality of image components further comprise a color difference component of the pixel.

6. The device of claim 2, wherein among the plurality of image components,
a first image component is an image component whose resolution is lowered, and
a second image component is a difference component between an original image component and the image component whose resolution is lowered.

7. The device of claim 2, wherein among the plurality of image components,
a first image component is an image component within a predetermined area, and
a second image component is an image component existing around the first image component.

8. The device of claim 1, wherein the predetermined fixed length is a maximum data length of one of the encoded components comprising a highest priority.

9. An image processing device comprising:
a reference image encoder configured to entropy-encode each of a plurality of image components extracted from a reference image, to generate a plurality of encoded components;
a cutoff module configured to select, according to a predetermined priority, one or a plurality of encoded components so that a data length is equal to or less than a predetermined fixed length;
a reference image decoder configured to decode the selected one of the plurality of encoded components to reproduce one or a plurality of image components;
a block matching module configured to detect, based on image contents of a motion-detection target block in an input image and the reproduced image components of a matching-target block of the reference image corresponding to the motion-detection target block, a motion vector of the motion-detection target block; and
an input image encoder configured to encode the input image using the motion vector.

10. The device of claim 9, wherein the block matching module is configured to calculate an encoding efficiency for a plurality of matching-target blocks based on a difference between the reproduced image component and the image component of the motion-detection target block for each pixel, and to output the motion vector of the matching-target block comprising higher encoding efficiency.

11. The device of claim 10, wherein the block matching module is configured to calculate the encoding efficiency taking the predetermined priority into consideration when the plurality of image components are reproduced.

12. The device of claim 10, wherein among the plurality of image components,
 a first image component is an image component whose resolution is lowered, and
 a second image component is a difference component between an original image component and the image component whose resolution is lowered.

13. The device of claim 10, wherein among the plurality of image components,
 a first image component is an image component within a predetermined area, and
 a second image component is an image component existing around the first image component.

14. The device of claim 9, wherein the predetermined fixed length is a maximum data length of one of the encoded components comprising a highest priority.

15. The device of claim 9, wherein the plurality of image components comprise a luminance component of a pixel.

16. The device of claim 15, wherein the plurality of image components further comprise a color difference component of the pixel.

17. An image processing system comprising:
 a reference image encoder configured to entropy-encode each of a plurality of image components extracted from a reference image, to generate a plurality of encoded components;
 a cutoff module configured to select, according to a predetermined priority, one or a plurality of encoded components so that a data length is equal to or less than a predetermined fixed length;
 a reference image decoder configured to decode the selected one or the plurality of encoded components to reproduce one or a plurality of image components;
 a block matching module configured to detect, based on image contents of a motion-detection target block in an input image and the reproduced image components of a matching-target block of the reference image corresponding to the motion-detection target block, a motion vector of the motion-detection target block;
 an input image encoder configured to encode the input image using the motion vector; and
 a display configured to decode the encoded input image to display the decoded input image.

18. The system of claim 17 further comprising a memory configured to store the encoded components selected by the cutoff module,
 wherein the reference image decoder is configured to readout and decode the encoded components stored in the memory.

19. The system of claim 17 further comprising a memory configured to store the reference image,
 wherein the reference image encoder is configured to readout the reference image stored in the memory and to generate the plurality of encoded components.

20. The system of claim 17 further comprising a memory configured to store the plurality of encoded components,
 wherein the cutoff module is configured to read out the plurality of encoded components stored in the memory and to select one or the plurality of encoded components.

* * * * *